(12) United States Patent
Liakopoulos et al.

(10) Patent No.: US 6,715,264 B2
(45) Date of Patent: Apr. 6, 2004

(54) METHOD FOR SECURING AN ARRAY OF COMPONENTS FOR PROCESSING IN A GAS-FLUSH PACKAGING MACHINE

(75) Inventors: Thomas W. Liakopoulos, Algonquin, IL (US); Richard N. Maskell, Hampshire, IL (US)

(73) Assignee: M-Tek, Inc., Elgin, IL (US)

( * ) Notice: Subject to any disclaimer, the term of this patent is extended or adjusted under 35 U.S.C. 154(b) by 0 days.

(21) Appl. No.: 10/056,235

(22) Filed: Jan. 28, 2002

(65) Prior Publication Data

US 2003/0140602 A1 Jul. 31, 2003

(51) Int. Cl.$^7$ ................ B65B 31/04; B65B 35/50; B65D 81/24
(52) U.S. Cl. ................ 53/434; 53/447; 206/213.1
(58) Field of Search ................ 53/434, 447, 399, 53/176; 426/129, 415; 206/213.1, 497

(56) References Cited

U.S. PATENT DOCUMENTS

| | | | |
|---|---|---|---|
| 1,097,142 A | * | 5/1914 | Schmunk ............... 53/449 |
| 3,681,092 A | * | 8/1972 | Titchenal et al. ........ 426/412 |
| 3,692,544 A | * | 9/1972 | Dendrinos ............... 426/87 |
| 4,295,563 A | * | 10/1981 | Becker et al. ........... 206/205 |
| 4,435,434 A | * | 3/1984 | Caporaso ............... 426/108 |
| 4,535,587 A | * | 8/1985 | Rias ..................... 53/436 |
| 5,354,569 A | * | 10/1994 | Brown et al. ........... 426/411 |
| 5,658,607 A | * | 8/1997 | Herdeman ............... 426/263 |
| 5,664,408 A | * | 9/1997 | Chesterfield et al. ...... 53/512 |
| 5,667,071 A | * | 9/1997 | Nakagoshi et al. ....... 206/455 |
| 5,934,470 A | * | 8/1999 | Bauer et al. ............ 206/494 |
| 5,945,147 A | * | 8/1999 | Borchard ............... 426/393 |
| 6,269,945 B1 | * | 8/2001 | Colombo ............... 206/213.1 |
| 6,279,737 B1 | * | 8/2001 | Long et al. ............. 206/205 |
| 6,305,148 B1 | * | 10/2001 | Bowden et al. .......... 53/432 |

* cited by examiner

Primary Examiner—Rinaldi I. Rada
Assistant Examiner—Paul Durand
(74) Attorney, Agent, or Firm—J.W. Gipple; Gipple & Hale

(57) ABSTRACT

A method and apparatus described to stabilize and secure individual component items in an array during gas flushing and packaging, without obstructing or preventing the free flow of the gas-flush throughout the component. In accordance with the present invention, when the array has been composed, it is over-wrapped with a loop of thin, inexpensive, gas-permeable film applied under pressure or shrunk around the array, leaving two opposite faces of the array free of the over-wrapping loop.

6 Claims, 3 Drawing Sheets

METHOD FOR SECURING AN ARRAY OF COMPONENTS FOR PROCESSING IN A GAS-FLUSH PACKAGING MACHINE

SUMMARY OF THE INVENTION

The object of the present invention is to provide a method to stabilize and secure individual component items in an array during gas flushing and packaging, without obstructing or preventing the free flow of the gas-flush throughout the component items.

BACKGROUND OF THE INVENTION

The present invention relates to a method and apparatus to secure an array of components while they are being processed in a gas-flush, heat sealed packaging machine.

Gas-flush, heat sealed packaging is an established and well known process. In the simplest form, it involves placing a perishable food item, such as meat, in a tray which is placed within a gas-impermeable plastic bag. The bag is then flushed with an inert gas (e.g. carbon dioxide) which expels the atmospheric gas (i.e. air) from the bag, at which point the opening to the bag is immediately sealed shut and the perishable food item is contained in a modified atmosphere that substantially prolongs its shelf life and preserves color.

It is often advantageous to so process a plurality of such perishable items in one large package. To do this, the individual items are placed in individual trays and over-wrapped with a gas-permeable plastic film to hold them in place. They are then stacked in a rectangular arrangement of rows and columns, called an "array." The array is then transported by such means as a conveyor belt to the gas-flush packaging machine where it is enclosed in a gas-permeable master bag which is then gas flushed and sealed. The area where trays are filled, over-wrapped, and stacked into arrays is often a substantial distance from the gas-flush packaging machine so the array has a long bumpy trip on the conveyor belt.

A problem frequently encountered in processing such arrays of component items results from the fact that upper surface of each component item is rounded, irregular and unpredictable. So when the component items are stacked, they comprise an unstable column, subject tilting, lurching and tumbling out of the array.

So there is a need for a means to stabilize and secure the component items in such an array during processing and until the array can be placed in the gas-impermeable master bag, gas flushed and sealed. However, any such means must not obstruct or prevent the free flow of the gas flush.

DETAILED DESCRIPTION OF THE DRAWINGS

In accordance with the present invention, an array is composed of component items each comprising a perishable food item in a tray and over-wrapped with plastic film. The plastic film is gas permeable. When the array has been composed, it is over-wrapped with a loop of thin, inexpensive film or paper which is readily gas-permeable, such as polyvinyl chloride plastic film or perforated, low density polyethylene plastic film, or perforated paper. To aid in securing the component items within the array, the over-wrapped loop of plastic film may be applied under tension, or it can be shrunk around the array after it has been applied. If it is perforated paper, the opposite ends of loops are overlapped and glued together.

It should be noted that the over-wrapped loop of plastic film or paper covers only four sides of the array, so two opposite faces of the array are free of the over-wrapping loop to facilitate rapid gas exchange. These opposite faces can be the two opposite sides, the opposite ends or the top and bottom of the array.

The invention will be more fully appreciated by having reference to the drawings which illustrate preferred embodiments thereof.

Figure 1:
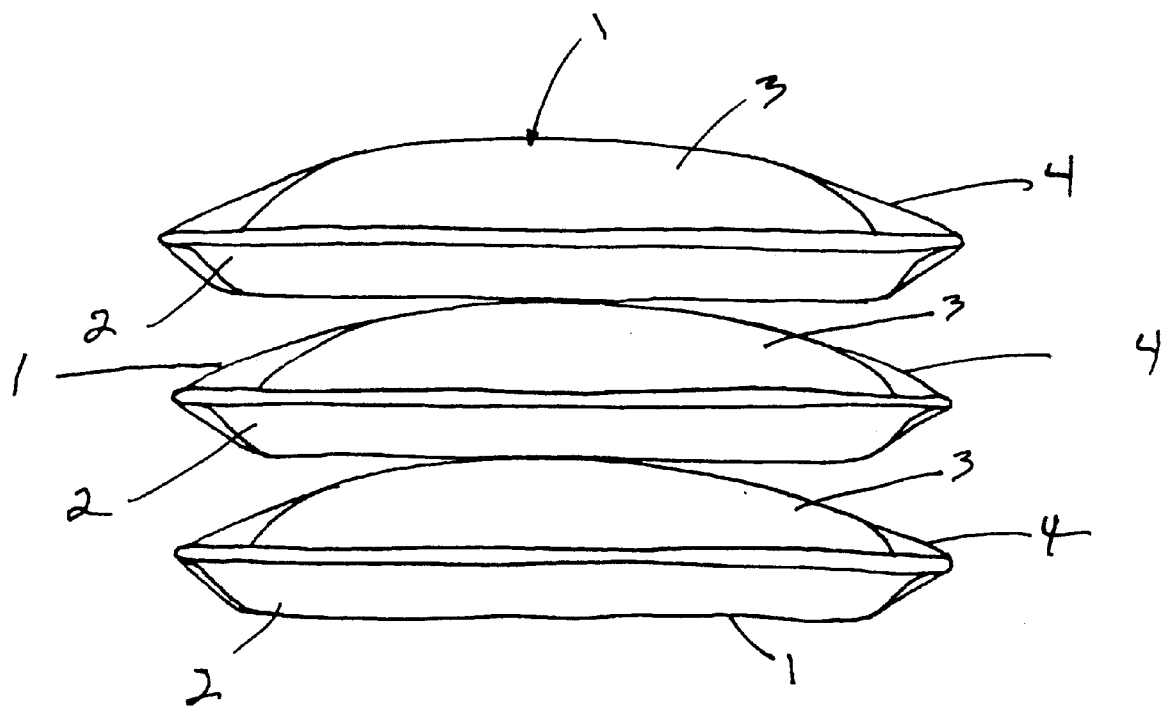
FIG. 1 is a side elevation view of stacked component items.

Directing attention to FIG. 1 of the drawings, each component item 1 comprises a tray 2, a perishable food item 3, and a wrap of plastic film 4. To appreciate and understand the invention, it is necessary to specify that the wrap 4 is of gas-permeable material, such as polyvinyl chloride, or perforated, low density polyethylene or paper.

It will also be understood and appreciated from FIG. 1, that the upper surface of each component item, is curved or irregular, so the stack tends to be unstable and the individual component items have a tendency to tilt, lurch and tumble out of the array.

Figure 2:
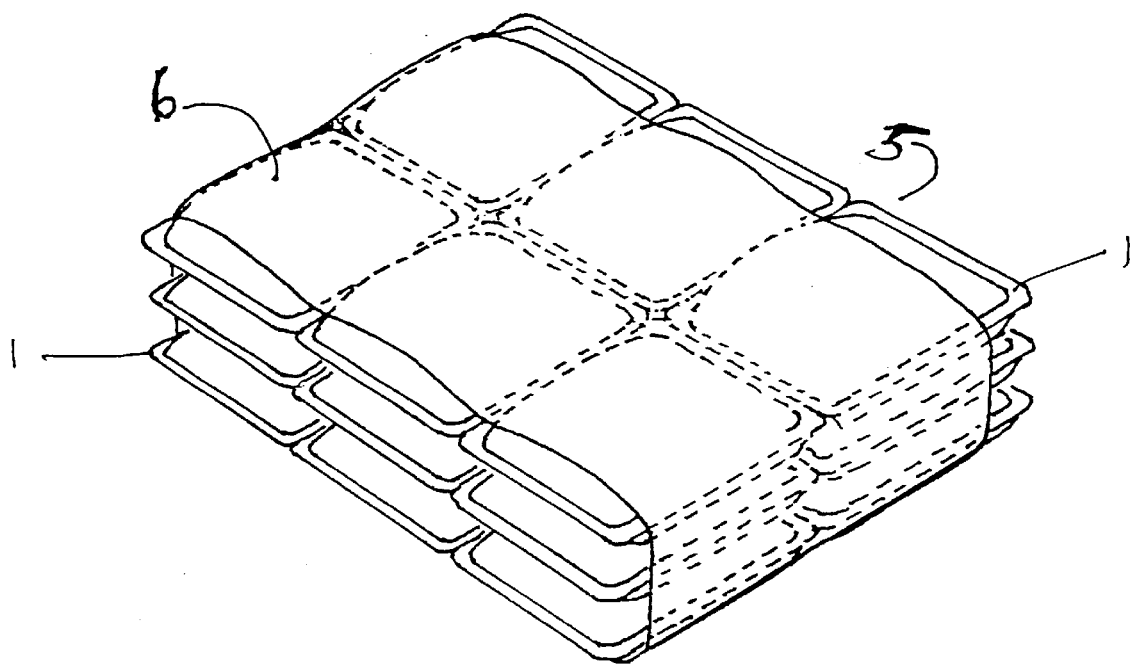
FIG. 2 is a perspective view of an array of component items with the loop of overwrap.

FIG. 2 illustrates the array 5 comprising two rows of three columns, each column being a stack of three individual component items 1, as illustrated in FIG. 1. So each array 5 comprises eighteen individual component items 1. The array 5 is overwrapped with a loop 6 of thin, inexpensive plastic film or paper which is gas-permeable, such as polyvinyl chloride or olefin film or perforated low density polyethylene film or perforated paper. The desirable qualities of the overwrap loop 6, is that it be relatively lightweight and inexpensive. The essential quality of overwrap loop 6 is that it be gas-permeable.

The overwrap loop 6, in the preferred embodiment is a plastic film that can be applied under tension and/or heat shrunk around the array 5 after it has been applied. Thus applied the overwrap loop 6, maintains the array 5 as a relatively stable unit and keeps the individual components 1, from tilting, lurching and falling out of the array.

The array 5, thus stabilized by overwrap loop 6, can be transported by conveyor belt to the gas-flush machine and further processed by being placed enclosed within a large flexible envelope or master bag formed of gas-impermeable material, which is gas flushed and sealed. Because all of the overwraps included in the array 5 are gas permeable, the gas flushing is effective throughout the array. And to facilitate rapid gas exchange, two opposite faces of the array 5 are left free from the overwrap loop 6. These opposite faces can be the two opposite sides (as illustrated in FIG. 2) or the two opposite ends or the top and bottom of the array 5.

Figure 3:
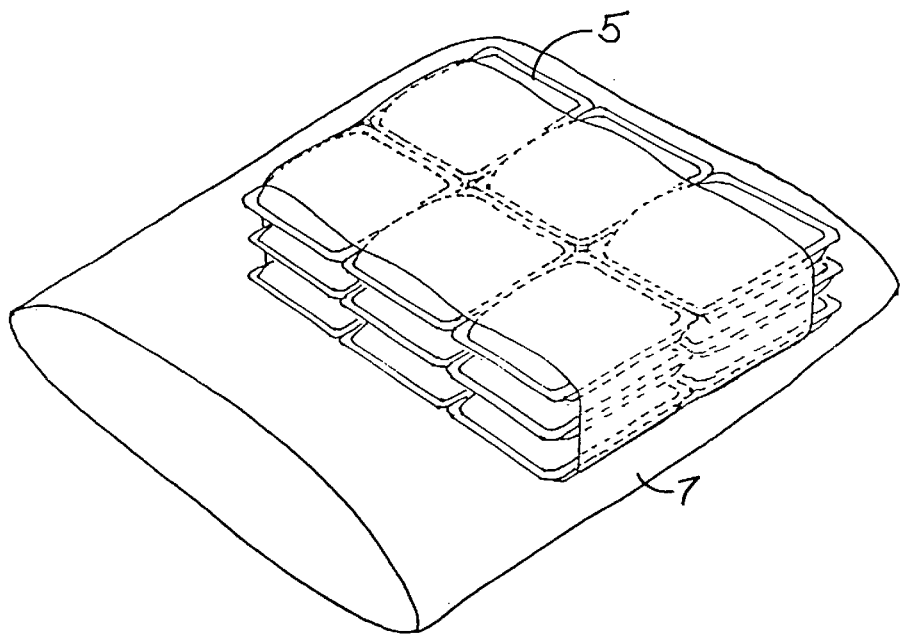
FIG. 3 is a perspective view of an array placed in a bag.

One method for creating a modified atmosphere within a master bag starts with placing the stabilized array of trays 5 into a master bag 7 (FIG. 3). If the array 5 is not stabilized, the individual trays are prone to sliding into a random pattern which seriously impedes reliable packaging operations.

Figure 4:
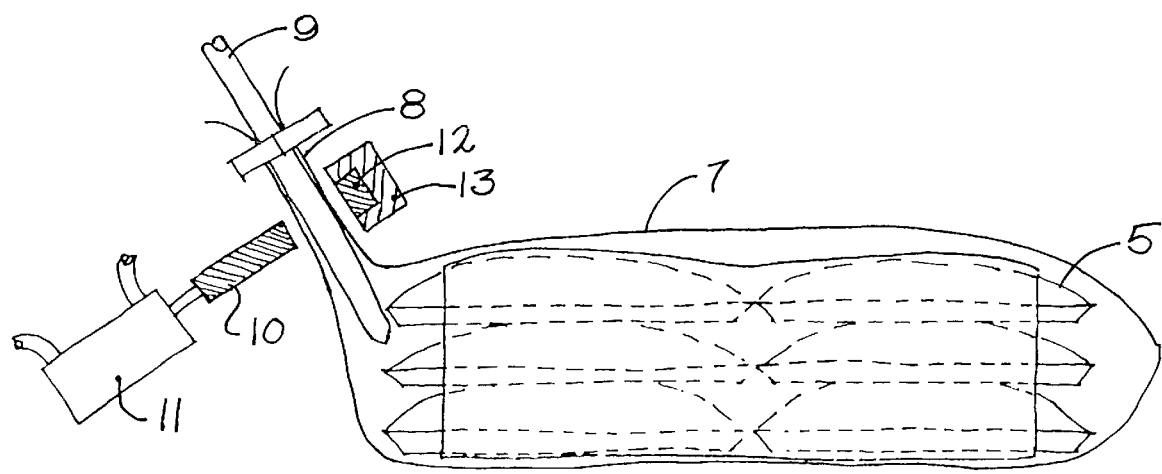
FIG. 4 is a cross-sectional view illustrating the gas-flush and sealing of a bag containing an array.

Referring now to the cross-sectional view in FIG. 4, the array 5 is positioned within the bag 7 so that a substantial neck of film 8 is available to feed into the packaging apparatus. The neck 8 of the bag 7 is clamped around a vacuum/gas flush probe 9 to exclude outside air. A vacuum source is first connected to the probe 9 so that air from within the bag is evacuated through the probe. The vacuum source is then isolated from the probe 9, and a gas source is connected to it. Once sufficient gas is introduced into the bag 7, the probe 9 is withdrawn from the bag 7, and the neck 8 of the bag 7 is hermetically sealed. FIG. 4 shows a typical sealing method with a heated sealer bar 10 connected to a pneumatic or hydraulic cylinder 11. Sealing is effected by using the cylinder to press the heated sealer bar 10 against the bag neck 8, which is backed up by an anvil consisting of silicon rubber 12 supported by a rigid frame 13. After a short period of time, the cylinder 11 retracts the sealer bar 10, leaving a heat-fused seal in the bag neck 8.

This method shows only one of a number of means for creating a modified atmosphere within the master bag, however, it demonstrates the critical requirement that the overwrapping loop in the invention permits rapid free flow of gases through the array of trays.

It will further be apparent to those skilled in the art that various modifications and variations can be made in the heat sealing device and method of the present invention without departing from the spirit or scope of the invention. Thus, it is intended that the present invention cover the modifications and variations of this invention provided they come within the scope of the appended claims and their equivalents.

What is claimed:

1. A method for stabilizing and securing individual component items in an array of such items during processing and packaging, comprising:

assembling component items to form an array;

looping a band of flexible, gas-permeable sheet material around said array, leaving at least two sides of the said array uncovered;

enclosing the said array within a gas-impermeable bag;

flushing said bag and its contained array with an inert gas, and;

sealing said bag.

2. The method of claim 1, wherein the said band of flexible gas-permeable sheet material is a plastic film applied under pressure.

3. The method of claim 1, wherein the said band of flexible gas-permeable sheet material is a plastic film that is heat shrunk after application.

4. The method of claim 1, wherein the said band of flexible gas-permeable sheet material is perforated plastic film.

5. The method of claim 1, wherein the said band of flexible gas-permeable sheet material is perforated paper sheet.

6. The method of claim 1, wherein the said component items comprise perishable foods contained in trays and overwrapped with gas-permeable plastic film.

* * * * *